United States Patent [19]

Song

[11] Patent Number: 5,740,891

[45] Date of Patent: Apr. 21, 1998

[54] CENTER BRAKE FOR AUTOMOBILES

[76] Inventor: Jae-hyou Song, 421-12 Mangu-3-dong, Junglang-gu, Seoul, Rep. of Korea

[21] Appl. No.: 732,509

[22] PCT Filed: May 9, 1995

[86] PCT No.: PCT/KR95/00052

§ 371 Date: Nov. 12, 1996

§ 102(e) Date: Nov. 12, 1996

[87] PCT Pub. No.: WO95/31650

PCT Pub. Date: Nov. 23, 1995

[30] Foreign Application Priority Data

May 12, 1994 [KR] Rep. of Korea ............... 94-10482

[51] Int. Cl.$^6$ ........................................... F16D 69/00
[52] U.S. Cl. ................. 188/326; 188/250 G; 188/250 B
[58] Field of Search ........................ 188/31, 69, 78, 188/156, 250 R, 250 A, 250 E, 250 G, 163, 325, 326, 329, 336-339, 363-368; 192/71, 107 T, 108

[56] References Cited

U.S. PATENT DOCUMENTS

| | | |
|---|---|---|
| 1,844,818 | 8/1932 | Gattie ........................... 188/31 |
| 2,351,114 | 6/1944 | Freeman ........................ 188/78 |
| 2,527,126 | 10/1950 | Goepfrich et al. ............ 188/326 |
| 3,066,766 | 12/1962 | Minor et al. .................... 188/78 |
| 3,176,804 | 4/1965 | Erickson ................... 188/250 G |
| 3,856,119 | 12/1974 | Harrington ..................... 188/69 |
| 5,062,506 | 11/1991 | White ........................ 188/106 A |
| 5,310,028 | 5/1994 | Sampson ....................... 188/329 |

Primary Examiner—Peter M. Poon
Assistant Examiner—Chris Schwartz
Attorney, Agent, or Firm—Van Cott, Bagley, Cornwall & McCarthy

[57] ABSTRACT

A center brake for automobiles is disclosed. The brake has braking teeth (which may be triangular, trapezoidal or of other shape) formed on the outer surfaces of the brake shoes and on the inner surface of the brake drum for improved brake performance. Preferred brake drum material is cast iron and preferred brake shoe material is non-toxic to avoid health damage to those who come into contact with the brake. The mechanical structure of the preferred brake results in a system which reliably carries out its brake shoe return function even when there is a failure or malfunction of brake return springs or ice on the brake during cold weather. The preferred brake can be alternatively actuated by a switch or lever.

9 Claims, 5 Drawing Sheets

CENTER BRAKE FOR AUTOMOBILES

TECHNICAL FIELD

The present invention relates in general to center brakes, in particular, for medium or large-sized automobiles such as trucks or buses used for temporary parking of the automobile with the engine running or for reliably preventing a parked automobile from rolling when the engine is shut off.

BACKGROUND ART

It is well known to those skilled in the art that automobile brakes are used not only for reducing the speed of automobiles and stopping automobiles but also for preventing parked automobiles from rolling. Automobile brakes typically generate frictional force and convert kinetic energy of a moving automobile into thermal energy and evolve the thermal energy to the atmosphere, thereby providing a braking function for a moving automobile.

Typically, small-sized automobiles use two different types of brakes—a foot brake and a hand brake. A foot brake is for braking a moving automobile in order to reduce the speed of or stop the automobile. A foot brake is actuated by foot manipulation of a brake pedal. A hand brake (also called a side brake or parking brake) is for manually braking the rear wheels of the automobile in order to keep the automobile stationary while it is parked. A hand brake is typically actuated by hand manipulation of a brake lever.

In contrast to the braking systems of small automobiles, medium and large automobiles such as trucks and buses also utilize a center brake. A center brake is typically a hand-operated brake which is adapted for braking a propeller shaft (also called a drive shaft) of an automobile. On common truck designs with a forward-mounted engine and using rear wheel drive, power is transferred from the engine through a transmission and then through an elongated propeller shaft or drive shaft connected to the transmission and to the rear differential. The propeller shaft or drive shaft is thus distinguished from an axle which transmits power from the differential laterally to a wheel of the automobile.

Both center brakes and hand brakes are used for prevention of possible slip or rolling of the automobile while it is parked on a slope. The censer brake is preferably used, in particular, when temporarily parking the automobile while leaving the engine running.

For example, fire engines or the fire trucks should be parked with the engine running when putting out afire. The engine of a fire truck should be left running in order to provide water pumping force or power. The gross weight of a fire truck carrying its load of water is very great. Consequently, a parked fire truck may be unstable and may tend to roll under its own weight when the truck is braked by the hand brake exclusively. Therefore, a center brake should be used in addition to a hand brake in order to securely brake and park a fire truck with the engine running.

However, there may be a problem when parking a fire truck with the engine running on a slope. That is, when the parking place of a fire truck is sloped, only a good center brake can reliably prevent the fire truck from moving. However, when the center brake of the fire truck is worn or malfunctioning, caused, for example, by abrasion of brake lining, the parked truck with the engine running and containing with much water may roll down the slope due to its great weight and may cause a terrible accident.

Of course, the above problem caused by a worn or malfunctioning center brake may occur in other medium or large-sized automobiles, such as a cargo truck or a bus, in addition to fire trucks.

Typically, brakes are classified into two types: drum brakes and disk brakes. In a typical drum brake, two arcuate brake shoes fitted with heat and water-resistant linings are forced against an inner or outer surface of a rotating drum. A drum brake in which the shoes are forced against the inner surface of the drum is referred to simply as an internal forcing type brake. A drum brake in which the shoes are forced against the outer surface of the drum is referred to simply as an external forcing brake. In a typical disk brake, disks attached to a fixed frame are pressed, using hydraulic pressure, against disks attached to a rotating axle or against the inner surfaces of a rotating housing. In both disk and drum brakes, the linings or pads used as braking means are typically made of asbestos which is noted to be very injurious to human health. In particular, asbestos is known to harm the function of hearts and lungs of users so that use of the asbestos for brake linings or pads is undesirable. The above brakes have another problem in that they do not achieve sufficiently great braking force, which is the object of brakes.

Still another problem of the above brakes is that the lining or pad of the brake is typically fixed to the brake shoe using a plurality of rivets. Consequently, production of brakes is difficult and costly. Furthermore, it is noted that the brakes of consistent performance are seldom produced during mass production, resulting in brakes of varying effectiveness.

DISCLOSURE OF THE INVENTION

It is, therefore, a primary object of the present invention to provide a center brake for automobiles in which the above problems can be overcome. The preferred brake includes a plurality of triangular or trapezoidal braking teeth integrally formed on the outer surfaces of the brake shoes and on the inner surface of the brake drum. When engaged, this structure provides perfect braking action and avoids the dangers of unreliable brakes.

It is another object of the present invention to provide a center brake for automobiles which does not use harmful material, such as asbestos, for the braking means. This provides a brake which does not cause functional diseases of hearts and lungs of users and which does not cause environmental pollution.

It is still another object of the present invention to provide a center brake for automobiles which reliably carries out its brake shoe or brake means return action even if there is a malfunction of the return springs or if the brake components freeze during cold weather. This remarkably improves the operational reliability of the center brake.

It is a further object of the present invention to provide a center brake for automobiles which can be handled by a switch without handling a lever when operating or releasing the center brake, thus to facilitate actuating the center brake.

In a preferred embodiment, the present invention provides a center brake for automobiles comprising: a brake drum fixed to a propeller shaft (i.e., drive shaft) of the automobile and adapted for braking the propeller shaft using frictional force generated by a pair of brake shoes; a housing fitted to and closing the drum and used as a mount for varieties of parts of the brake; a pair of brake shoes pivoted to the housing by anchor pins such that the shoes are selectively turned about their anchor pins by action of a cam and forced against the inner surface of the drum at a given frictional force; the cam being fixedly mounted to a shaft of an operating lever located at the top ends of the shoes and adapted for biasing the top ends of the shoes outward and opening the shoes in the drum, the operating lever being selectively operated by a brake lever; a plurality of return springs for elastically returning the operating lever and the shoes to their original positions when the brake lever is free from an actuating force; an adjuster disposed between the bottom ends of the shoes and adapted for controlling a gap between the shoes; a compression coil spring extending between he bottom ends of the shoes about the adjuster and adapted for preventing separation of the adjuster from the shoes; and a plurality of braking teeth integrally formed on the inner surface of the drum and on the outer surfaces of the shoes, the braking teeth of the shoes engaging with the braking teeth of the drum during a braking action of the brake.

In another embodiment, the present invention provides a center brake for automobiles comprising: a brake drum fixed to a propeller shaft of an automobile and adapted for braking the propeller shaft using frictional force generated by a pair of brake shoes; a housing fitted to and closing the drum and used as a mount for varieties of parts of the brake; a pair of brake shoes disposed in the drum such that the shoes are moved outward and opened by action of a pair of cams and forced against the inner surface of the drum at a given frictional force; the cams fixedly mounted to a shaft of an operating lever at ends of the shoes and adapted for biasing the ends of the shoes outward and for opening the shoes in the drum in order to force the shoes against the inner surface of the drum; a plurality of return springs for elastically returning the shoes to their original positions when the brake lever is released; and a plurality of braking teeth integrally formed on the inner surface of the drum and on the outer surfaces of the shoes, the braking teeth of the shoes engaging with the braking teeth of the drum during a braking action of the brake.

The center brake of this invention provides a perfect braking action and ensures a parked automobile will not roll under its own weight. The preferred brake materials do not cause functional diseases of hearts and lungs of users and do not cause environmental pollution. The preferred brake structure provides a reliable return motion of the brake shoes and facilitates handling of the brake.

BRIEF DESCRIPTION OF DRAWINGS

The above and other objects, features and other advantages of the present invention will be more clearly understood from the following detailed description taken in conjunction with the accompanying drawings, in which:

FIGS. 3A and 3B are partially enlarged views of center brakes of a preferred embodiment of the invention respectively, in which:

FIG. 3A shows the center brake having a plurality of triangular braking teeth formed on the brake shoes and on the brake drum; and FIG. 3B shows the center brake having a plurality of trapezoidal braking teeth formed on the brake shoe and on the brake drum;

BEST MODE FOR CARRYING OUT THE INVENTION

Figure 1:
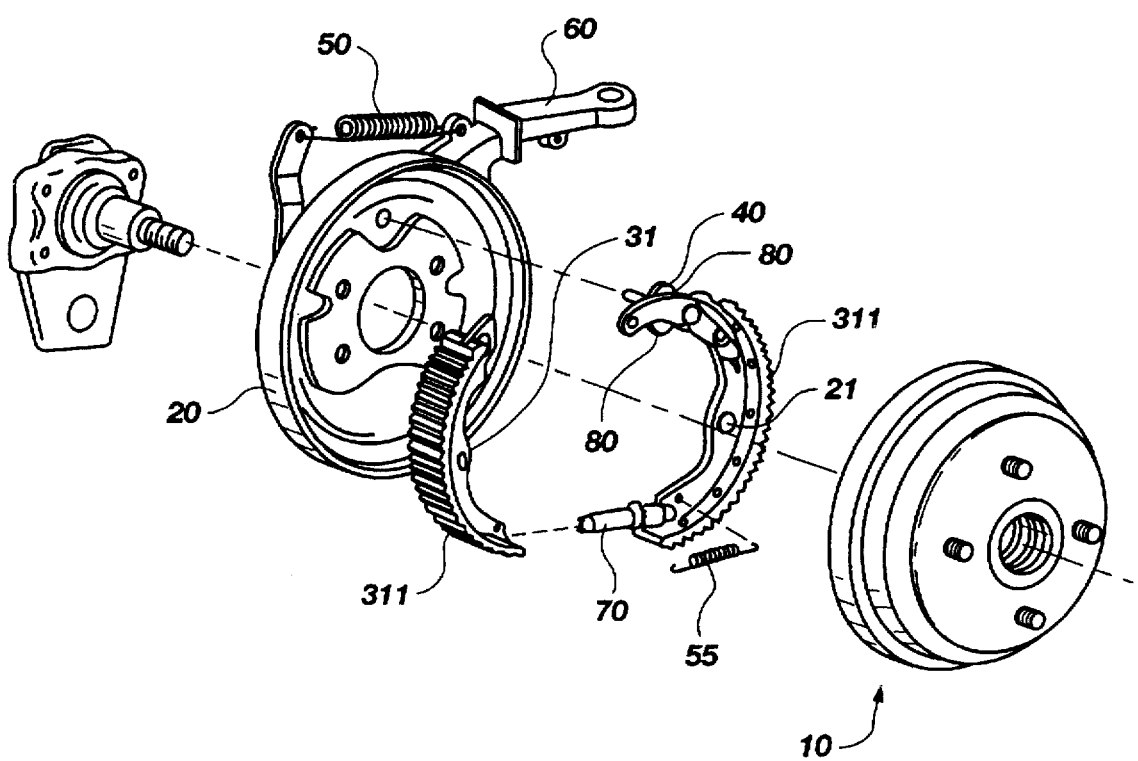
FIG. 1 is an exploded perspective view of a center brake in accordance with a preferred embodiment of the present invention.
Figure 2:
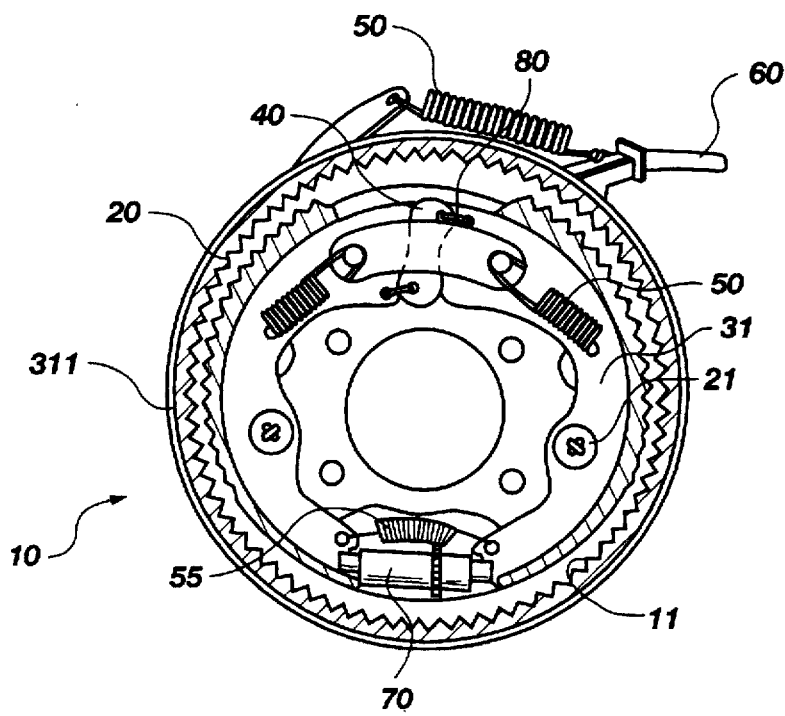
FIG. 2 is a front view of the center brake of Fib. 1. after assembling the parts of the brake.

With reference to FIGS. 1 and 2. there is shown a center brake for automobiles in accordance with a primary embodiment of the present invention.

As shown in the drawings, a center brake of the invention is depicted.

The preferred center brake is of the internal forcing type (i.e., it forces brake shoes from an inward to an outward position to cause a braking action). The preferred brake includes a brake drum 10, which drum 10 is directly fixed to a propeller shaft or drive shaft (not shown) of an automobile. A propellor shaft or drive shaft is distinguished from an axle shaft in that a propellor shaft typically transmits power from a transmission to a differential of an automobile, while an axle shaft typically transfers power from a differential of an automobile to its wheel. The brake drum 10 is adapted for braking the propeller shaft by using frictional force generated by a pair of brake shoes 31. The drum 10 is fitted to and closed by or against a housing 20. The housing 20 forms an internal space between it and the drum 10, which will be occupied by brake shoes 31 and other parts. Housing 20 is used as a mount or mounting plate on which varieties of parts of the brake can be mounted or attached. The brake also includes a pair of shoes 31. The brake depicted uses single action shoes (i.e., the shoes are driven toward the drum at only one of their ends), and the brake is of the two-leading shoes type (i.e., both shoes, as opposed to only a single shoe, are directly driven toward the drum by an actuating force). The shoes 31 are provided, on their outer surfaces, with braking teeth 311. The shoes 31 are pivotable with respect to the housing 20 by their anchor pins 21 such that the shoes 31 are selectively turned about their anchor pins 21 by action of a cam 40 and forced against the toothed inner surface of the drum 10 at a given frictional force. The cam 40 is fixedly mounted to a shaft of an operating lever 60 at the top ends of the shoes 31, thus to bias the top ends of the shoes 31 outward and to open the shoes 31 within the drum 10 in order to cause the shoes 31 to be forced against the inner surface of the drum 10. The operating lever 60 is selectively operated by a brake lever. The brake also includes a plurality of return springs 50 which are provided both for the operating lever 60 and for the shoes 31 and which are adapted for elastically returning the operating lever 60 and the shoes 31 to their original positions when the brake lever (such as a flexible wire) is free from activating force. In the brake of this invention, the gap between the shoes 31 can be adjusted by a gap adjuster 70, which adjuster 70 is disposed between the bottom ends of the shoes 31. A compression coil spring 55 is connected between the bottom ends of the shoes 31 adjacent the adjuster 70 and prevents possible sudden separation of the adjuster 70 from the shoes 31.

In the above center brake, the inner surface of the drum 10 and the outer surface of each shoe 31 are provided with triangular or trapezoidal braking teeth 11 and 311, which teeth 11 and 311 are integrally formed on their associated surfaces of the drum 10 and of the shoe 31. In this primary embodiment, the braking teeth 311 of the shoes 31 are partially formed on the outer surfaces of the shoes 31 such that the teeth 311 are exclusively formed in a portion of each shoe 31 from a turning center of each shoe 31 to about the top end or the cam contact end of the shoe 31. The center brake further includes a pair of connectors 80 which connect the opposed ends of the cam 40 to the top ends of the shoes 31 respectively. The connectors 80 are adapted for smoothing the returning motion for the shoes 31 when releasing the brake.

Figure 6:
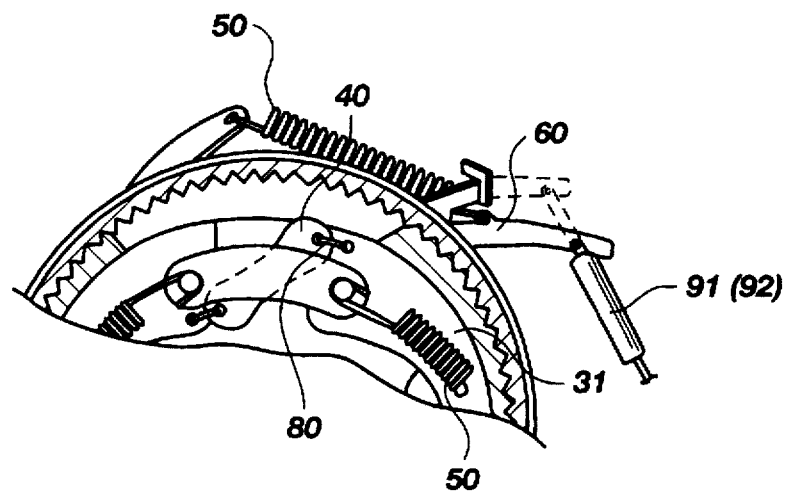
FIG. 6 is a partial view of the center brake provided with an air booster or solenoid used as return means in accordance with the invention.

As shown in FIG. 6, an air booster 91 or a solenoid 92 is provided as means for forcibly returning the operating lever 60, the cam 40, and the shoes 31 to their original positions.

Please note that the air booster 91 may be preferably used as the forcible returning means for a brake for a large automobile, while a solenoid 92 is preferably used as the forcible returning means for a brake used in a small or medium-sized automobile.

Figure 7:
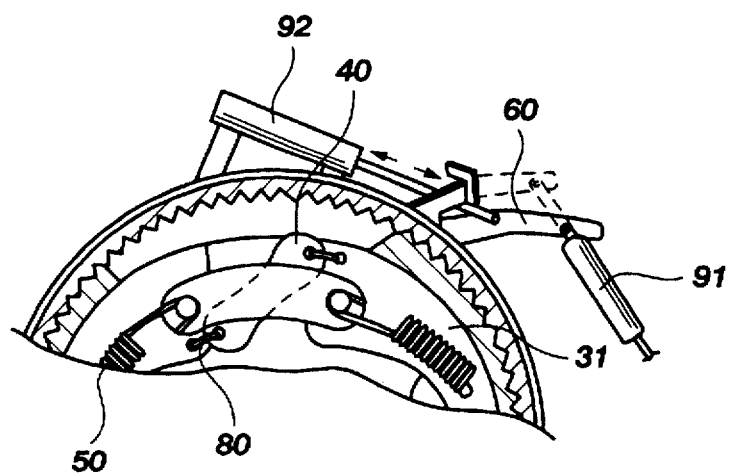
FIG. 7 is a partial view of the center brake provided with a solenoid and air booster used as braking means and return means of the brake, respectively, in accordance with the invention.

FIG. 7 shows the braking means and the returning means of the invented center brake in accordance with another embodiment of the invention. In this embodiment, the operating lever 60 is provided with both a switch-operated one touch solenoid 91 used as the braking means, and an air booster 92 used as the returning means. The air booster 92 is supplied with air at the same time of release of the one touch solenoid 91, thus to return the operating lever 60, the cam 40 and the shoes 31 to their original positions and to release the center brake.

Figure 4A:
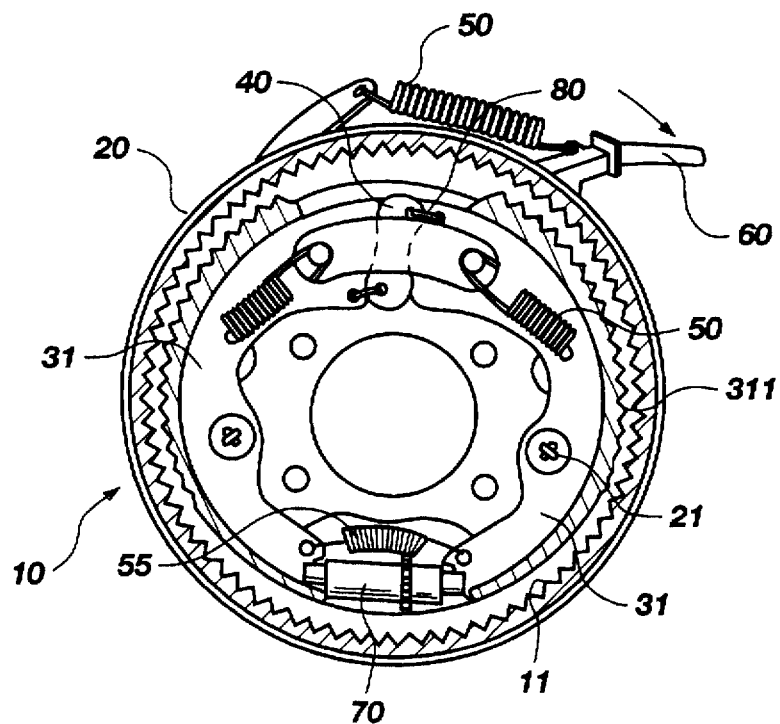
FIGS. 4A and 4B are sectional views showing operation of the internal forcing brake (the brake being of the single action type and using two leading shoes) having triangular braking teeth of the invention.
Figure 4B:
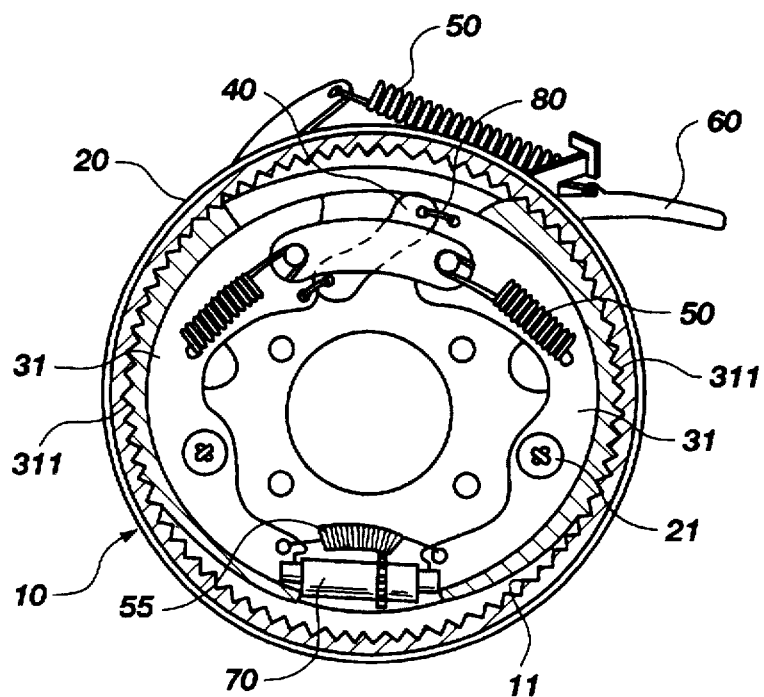
Figure 5A:
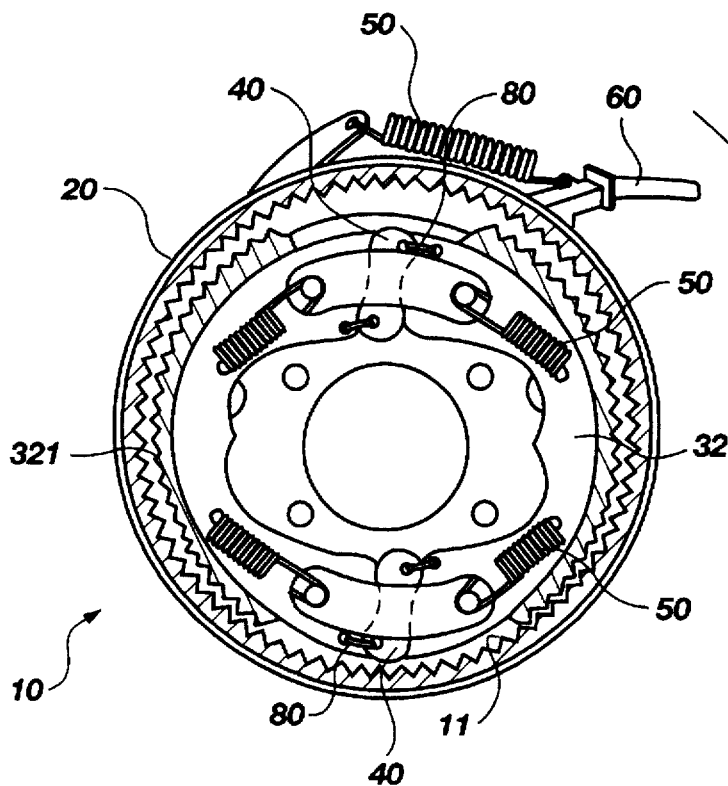
FIGS. 5A and 5B are sectional views showing operation of an internal forcing brake (having a pair of double action shoes that are both leading shoes) in accordance with another embodiment of the invention.
Figure 5B:
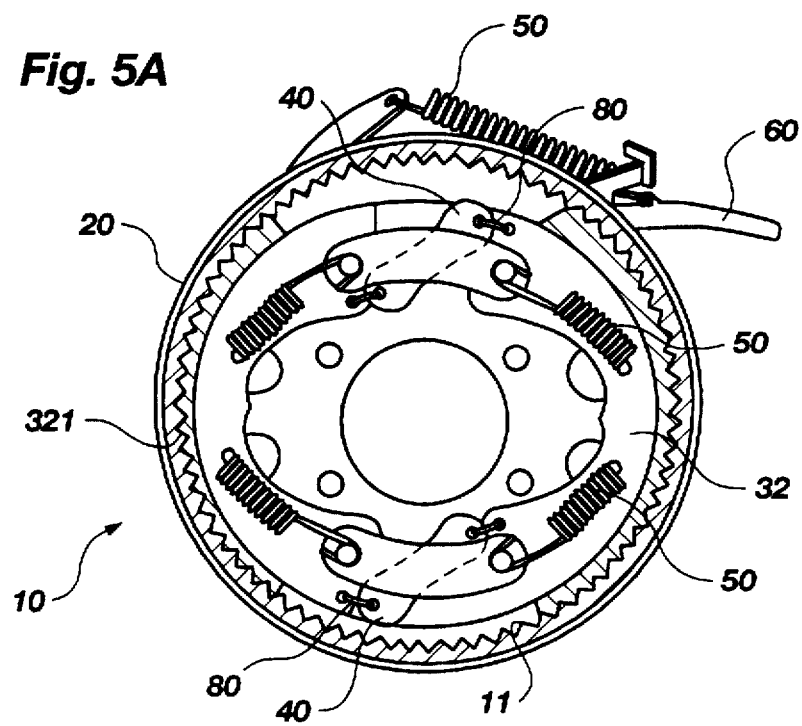

The present invention may be adapted for use in an internal forcing center brake having a pair of double-action (i.e., both the top and the bottom of the leading shoes are forced toward the drum by an activating force) two-leading shoes as shown in FIGS. 5A and 5B. In this embodiment, the center brake includes a brake drum 10 which is directly fixed to a propeller shaft of an automobile (not shown) and adapted for braking the propeller shaft using frictional force generated by a pair of brake shoes 32. The drum 10 is fitted into and closed by or against a housing 20. The housing 20 forms an internal space between it and the drum 10 where the shoes 32 and other parts are located. Various parts of the brake are mounted to the housing 20. The brake also includes a pair of double-action two-leading shoes 32. The shoes 32 can be moved outward and opened by action of a pair of cams 40 and forced against the inner surface of the drum 10 at a given frictional force. The cams 40 are mounted to a shaft of an operating lever 60 at the opposed ends of the shoes 32 (as depicted in the figure, the top end of each shoe 32 is activated by a first cam and the bottom end of each shoe is activated by a second cam). The cams 40 bias the opposed ends of the shoes 32 outward and to open the shoes 32 in the drum 10 in order to force the shoes 32 against the inner surface of the drum 10. The brake also includes a plurality of return springs 50 which are provided for the operating lever 60 and for the shoes 32 and which are adapted for elastically returning the operating lever 60 and the shoes 32 to their original positions when the brake lever (such as a flexible wire) is released. In this center brake, the inner surface of the drum 10 and the outer surface of each shoe 32 are provided with triangular or trapezoidal braking teeth 11 and 321, which teeth 11 and 321 are integrally formed on their associated surfaces. In contrast to the preferred embodiment of FIGS. 4A and 4B, the braking teeth 321 of the shoes 32 of this embodiment are nearly totally formed on the outer surfaces of the shoes 32.

The operational effect of the center brake of the invention will be given hereinbelow.

When forming the drum 10 and the single-action two-leading shoes 31 of the center brake according to the preferred embodiment of the invention, the braking teeth 11 and 311 are integrally formed, using given molds, on the inner surface of the drum 10 and on the outer surfaces of the shoes 31 respectively.

In contrast to typical center brakes, the center brake of this invention has no lining on the outer surfaces of the shoes but has the triangular or trapezoidal braking teeth 11 and 311 integrally formed on the inner surface of the drum 10 and on the outer surfaces of the shoes 31. The braking teeth 11 and 311 are preferably made of cast iron. With the braking teeth 11 and 311, the brake of this invention is free from post-machining and remarkably saves manufacturing cost and simplifies assembly and disassembly of the center brake.

Figure 3A:
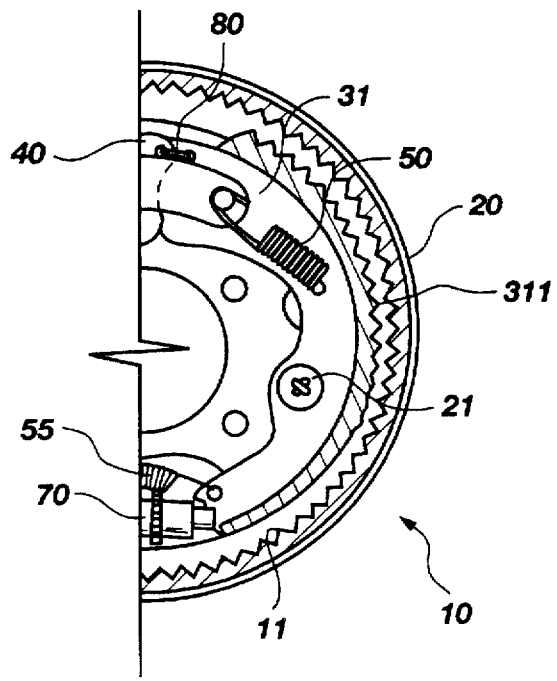
Figure 3B:
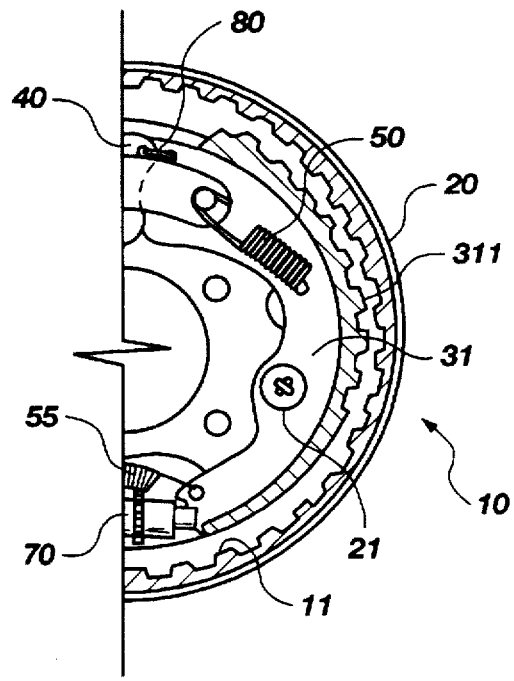

In the present invention, the braking teeth 11 and 311 have either the triangular shape or the trapezoidal shape as shown in FIGS. 3A and 3B. Please note that it is preferred to use braking teeth 11 and 311 for a small or medium-sized automobile that have the triangular shape of FIG. 3A, while it is preferred to use braking teeth 11 and 311 for a large automobile that have the trapezoidal shape of FIG. 3B, as teeth with trapezoidal shape an achieve stronger tooth-engaging force and thereby provide a more secure braking action.

The single-action two-leading shoes 31 of the center brake are pivotable with respect to the housing 20 about their anchor pins 21 and selectively turnable about their anchor pins 21 by action of the cam 40 and are thereby forced against the inner surface of the drum 10. In this case, the braking teeth 311 of the shoes 31 come into engagement with the teeth 11 of the drum 10 in such a manner that the tooth engagement between the teeth 11 and 311 starts at the teeth 311 about the anchor pins 21. Therefore, when the teeth 311 are totally formed on the outer surfaces of the shoes 31, the teeth 311 about the top ends of the shoes 31 will not firmly engage with the teeth 11 of the drum, and will tend to slip off of teeth 11, reducing the effective braking force of the center brake. Furthermore, when the braking teeth 311 are totally formed on the outer surfaces of the shoes 31, the teeth 311 come into forcible engagement with the teeth 11 so that the brake cannot achieve desired smooth returning motion of the shoes 31 when releasing the brake.

In order to resolve the above possible problem, the teeth 311 of each shoe 31 are partially formed on the outer surface of the shoe 31 within the range from the turning center of each shoe to the top end of the shoe. In addition, the thickness of the teeth 311 gradually increases in the direction from the turning center to the top end of each shoe 31. The teeth 311 of the shoes 31 thus substantially meet with the teeth 11 of the drum of the drum 10 as shown in FIG. 4B when the shoes 31 are opened outward by the cam 40.

The center brake having single-action two-leading shoes 31 according to the invention achieves the invented desired brake function for braking the propeller shaft of the automobile.

The center brake includes the connectors 80 which connect the opposed ends of the cam 40, fixed to the operating lever 60, to the top ends of the shoes 31 respectively. As the connectors 80 pull the shoes 31 when the cam 40 returns to its original position in response to releasing of the brake, this brake achieves a smoother return motion of the shoes 31 in comparison with typical brakes having no means for connecting the cam 40 to the shoes 31.

The operating lever 60 of the center brake is provided with a solenoid 91 or air booster 92, as shown in FIG. 6. This is in consideration of possible malfunction of the return springs 50 and possible freezing of the interface between the shoes 31 and the drum 10 in the winter. The solenoid 91 or air booster 92 ensures return of the shoes 31 when the center brake is released. When releasing the brake in the case of malfunction of the springs 50 or of freezing of the interface, the air booster 92 or the solenoid 91 forcibly turns the operating lever 60, thus to cause return of the cam 40 and the shoes 31, both cooperating with the lever 60, to their original positions. Therefore, this center brake can be reliably released even in the case of malfunction of the springs 50 or of freezing of the interface between the drum 10 and the shoes 31 in the winter.

The air booster 92 is operated by the air exclusively applied thereto when the engine is running, and provides such a large amount of force that the booster 92 is preferably used in a brake for a large automobile. Meanwhile, the solenoid 91 is operated by a switch and preferred to be used in a brake for small or medium-sized automobiles.

The solenoid 91 is a one touch solenoid. When the solenoid 91 is turned on and operated once, the solenoid 91 can maintain its previous state even when the engine is turned off. The solenoid 91 having been kept in its previous state, returns to its original position at the same time that power is turned off when the engine is running and the switch is turned off by the driver releasing the center brake.

FIG. 7 shows the braking means and the returning means of the center brake in accordance with another embodiment of the invention. In this embodiment, the switch-operated one touch solenoid 91 used as the braking means is coupled to a side of the operating lever 60, while the air booster 92 used as the returning means is coupled to the other side of the operating lever 60. The solenoid 91 is turned on in response to switch operation, thus to actuate the braking operation of the center brake. When the air booster 92 is operated when the solenoid 91 is turned off, it reliably returns the operating lever 60, the cam 40 and the shoes 31 to their original positions.

When the switch-operated one touch solenoid 91 and the air booster 92 are used as the braking means and the returning means of the center brake as described above, the center brake does not need to be operated by the brake lever but is simply operated by switch operation so that it is possible to facilitate operation of the brake.

Turning to FIGS. 4A and 4B, there is shown operation of the center brake having single-action two-leading shoes 31 of the invention. As shown in the drawings, when the brake is released, the arcuate two leading shoes 31 in the brake drum 10 are biased inward by the spring force of the return springs 50 and turned inward about their anchor pins 21, thus to be closed as shown in FIG. 4A.

In this case, there is a gap between the braking teeth 11 of the drum 10, fixed to the propeller shaft of the automobile, and the teeth 311 of the shoes 31 so that the propeller shaft is applied with no braking force but can freely rotate.

When the brake lever or the switch (not shown) is actuated in order to brake and stop the automobile, the operating lever 60 which is pivoted to the housing 20 and biased by the return spring 50 is forcibly turned at a given turning angle in the direction of arrow of FIG. 4A. Therefore, the cam 40 fixed to the operating lever 60 is also turned clockwise or in the turning direction of the lever 60.

The two-leading shoes 31, contacting the cam 40 at their top ends, are thus turned outward about their anchor pins 21 by the clockwise turning motion of the cam 40, and are thus opened in the drum 10. Hence, the braking teeth 311 of the shoes 31 come into engagement with the braking teeth 11 of the drum 10 as shown in FIG. 4B.

When the teeth 311 of the shoes 31 substantially engage with the teeth 11 of the drum 10 as shown in FIG. 4B, there is no slip between the shoes 31 and the drum 10. Thus, with this center brake can be stably braked. In this regard, the center brake of the invention prevents possible safety accident caused by bad braking action of the brake.

In the center brake of this invention, the braking teeth 11 and 311 made of cast iron have excellent durability in comparison with typical prior art brake linings made of asbestos. The teeth 11 and 311 will seldom wear at all and do not lose their braking function regardless of how long they are used. Therefore, the center brake of this invention can be used indefinitely.

When the brake lever or the switch is handled in order to release the brake, the solenoid 91 or the air booster 92 may be used as a return means. The return function causes the arcuate two leading shoes 31 in the brake drum 10 to be biased inward by the spring force of the return springs 50 and thus turned inward about their anchor pins 21, causing them to be closed as shown in FIG. 4A and to thereby release the propeller shaft of the automobile.

Of course, the present invention may be adapted for an internal forcing center brake having the double-action two-leading shoes 32 as shown in FIGS. 5A and 5B. In this case, the center brake will achieve the same operational effect as described for a brake having the single-action two-leading shoes 31.

As the single-action two-leading shoes 32 are evenly biased outward by turning motion of the pair of cams 40 contacting the opposed ends of the shoes 32, braking teeth 321 each of equal thickness should be nearly totally formed on the outer surfaces of the shoes 32. This is different from the teeth 311 of the shoes 31 of the primary embodiment.

In this second embodiment, the braking teeth 11 of the drum 10 and the braking teeth 321 of the shoes 32 may have either the triangular shape or the trapezoidal shape in the same manner as described for the primary embodiment having the single-action two-leading shoes 31.

The center brake of the second embodiment also has a pair of connectors 80 for connecting the opposed ends of each cam 40 to their associated ends of the shoes 32. The connectors 80 are adapted to provide a smooth return motion of the shoes 32. In the same manner as described for the primary embodiment, the center brake of this second embodiment may include a solenoid 91 or an air booster 92 which will be used as the return means for the brake as shown in FIG. 6. Of course, it should be understood that the brake may be provided with a solenoid 91 and an air booster 92 which will be used to actuate the braking means and to release the brake, respectively, of the brake as shown in FIG. 7.

FIGS. 5A and 5B show operation of a center brake of the invention having double-action two-leading shoes 32. The operation of this brake is the same as brakes discussed above which use shoes 31, except for the direction of movement of the shoes 32.

In contrast to typical center brakes having asbestos linings, the center brake of the invention having cast iron braking teeth 11, 311, 321 reliably holds an automobile in place and does not allow it to roll until the brake is released. In this regard, the center brake prevents possible abrasion of the brake due to unskilled handling of the brake lever.

INDUSTRIAL APPLICABILITY

As described above, the present invention provides a center brake for automobiles which is provided with a plurality of triangular or trapezoidal braking teeth integrally formed on the outer surfaces of the brake shoes and on the inner surface of the brake drum, thus to provide perfect braking action of the center brake and to prevent possible safety problems caused by ineffective prior art brakes.

The invented center brake does not use harmful materials, such as asbestos. Instead, steel is used as the braking means, thus preventing the braking means not only from causing disease to users, but also avoids causing environmental pollution.

The invented center brake includes an air booster or a solenoid and reliably carries out its brakeshoe return function even if the brake freezes during the winter, thus remarkably improving the reliability of the center brake.

The instant center brake can be actuated by a switch without use of brake lever when operating or releasing the center brake, thus to facilitate use of the brake.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

I claim:

1. A center brake for automobiles comprising:
   a brake drum fixed to a drive shaft of the automobile, the brake drum being adapted for braking the drive shaft using frictional force generated by a pair of brake shoes when the brake is engaged,
   a housing which said brake drum may be installed to, the combination of housing and brake drum creating an enclosure in which brake parts may be located,
   a pair of brake shoes installed on said housing by use of anchor pins, each of said brake shoes having a first end and a second end, said brake shoes being capable of pivoting with respect to said housing about said anchor pins when said brake shoes are forced against the inner surface of said brake drum by an actuating force when the brake is engaged,
   a cam located on said housing, said cam being capable of exerting an actuating force on said brake shoes when the brake is engaged, the cam thereby biasing said brake shoes outward so that they pivot about their anchor pins and contact the inner surface of said brake drum,
   an operating lever attached to said cam and being capable of effecting actuation of said cam,
   a plurality of return springs for elastically returning said operating lever and said brake shoes to their original positions when said brake is disengaged,
   an adjuster disposed between said second ends of said brake shoes, said adjuster being adapted for controlling a gap between said brake shoes,
   a compression coil spring extending between said second ends of said brake shoes proximate to said adjuster and adapted to prevent separation of said adjuster from said brake shoes, and
   a plurality of braking teeth integrally formed on the inner surface of said drum and on the outer surfaces of said shoes, the braking teeth of said shoes engaging with the braking teeth of said drum when the brake is engaged;
   wherein actuation of said brake shoes by said cam causes said brake shoes to come into contact with and firmly engage said brake drum with the interior surface of said brake drum when the brake is engaged.

2. The center brake recited in claim 1,
   wherein said anchor pins define a turning center for each of said brake shoes, the turning center being the point about which said brake shoes turn when the brake is engaged; and
   wherein said braking teeth of said brake shoes are formed on the outer surfaces of said brake shoes from about said turning centers of said brake shoes to about said first ends of said brake shoes.

3. The center brake recited in claim 1,
   wherein said braking teeth of said brake shoes and said braking teeth of said brake drum are triangular in shape.

4. The center brake recited in claim 1,
   wherein said braking teeth of said brake shoes and said braking teeth of said brake drum are trapezoidal in shape.

5. The center brake recited in claim 1, further comprising:
   a pair of connectors for connecting said cam to said first ends of said brake shoes;
   wherein said connectors are adapted to provide a smooth return motion of said brake shoes when the brake is disengaged.

6. The center brake recited in claim 1, further comprising:
   an air booster coupled to said operating lever;
   wherein said air booster is adapted to forcibly return said operating lever, said cam and said brake shoes to their original positions when the brake is disengaged.

7. The center brake recited in claim 1, further comprising:
   a solenoid coupled to said operating lever;
   wherein said solenoid is adapted to forcibly return said operating lever, said cam and said brake shoes to their original positions when the brake is disengaged.

8. The center brake recited in claim 1, further comprising:
   a solenoid coupled to said operating lever, said solenoid being capable of engaging the brake by operating said operating lever, and
   an air booster coupled to said operating lever, said air booster being capable of disengaging the brake, said air booster being configured to be supplied with air when said solenoid is turned off, thereby effecting brake disengagement by forcibly returning said operating lever, cam and brake shoes to their original positions.

9. A center brake for automobiles comprising:
   a brake drum fixed to a drive shaft of an automobile and adapted for braking the drive shaft by using frictional force generated by a pair of brake shoes,
   a housing against which said brake drum may be installed, the combination of brake drum and housing forming an enclosure in which brake parts may be located, and said housing forming a mounting location where brake parts may be installed,
   a pair of brake shoes disposed in said brake drum, each of said brake shoes having a first end and a second end, said brake shoe first ends being adjacent each other in the assembled brake, and said brake shoe second ends being adjacent each other in the assembled brake, an operating lever, a first cam and a second cam installed to be actuated by said operating lever, said first cam being installed in said enclosure between said brake shoe first ends, and said second cam being installed in said enclosure between said brake shoe second ends, a plurality of return springs being capable of elastically returning said brake shoes to their original positions when the brake is disengaged, and a plurality of braking teeth integrally formed on the inner surface of said drum and on the outer surfaces of said brake shoes, the braking teeth of said brake shoes engaging the braking teeth of said brake drum when the brake is engaged.

* * * * *